R. B. WILLIAMSON.
INDUCTION MOTOR.
APPLICATION FILED MAR. 1, 1907.

953,809.

Patented Apr. 5, 1910.

Witnesses
Oliver W. Harman
Fred J. Kinsey

Inventor
Robert B. Williamson
By Chas. E. Lord
Attorney

UNITED STATES PATENT OFFICE.

ROBERT B. WILLIAMSON, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO, JOINTLY.

INDUCTION-MOTOR.

953,809.   Specification of Letters Patent.   Patented Apr. 5, 1910.

Application filed March 1, 1907. Serial No. 359,952.

*To all whom it may concern:*

Be it known that I, ROBERT B. WILLIAMSON, citizen of the United States, residing at Norwood, in the county of Hamilton and State of Ohio, have invented certain new and useful Improvements in Induction-Motors, of which the following is a full, clear, and exact specification.

My invention relates to electric motors and especially to means for varying the resistance of the rotor circuits of induction motors.

It is advantageous to have the resistance of a rotor circuit of an induction motor higher at starting and at low speeds than at high speeds. This has been done by connecting the rotor windings through slip rings to an external variable resistance. It has also been done by having a variable dead resistance within the rotor. Both of these methods require the use of a resistance in addition to the windings of the rotor.

It is the object of my present invention to be able to vary the resistance of the rotor circuit of an induction motor without the use of any resistance other than that of the rotor windings themselves.

With this object in view, my invention comprises the combination in an induction motor, of a field magnet, a rotor having a distributed winding, and means for determining whether currents shall flow through different substantially equal parts of said winding in series or in parallel.

Somewhat more specifically, my invention comprises the combination in an induction motor, of a field magnet, a rotor having a distributed winding, each section of which comprises an uneven number of parts permanently connected end to end, and means for short-circuiting said parts in groups or individually in such a manner that the total electromotive force in any closed circuit is never greater than the electromotive force of one of said parts.

Other novel features of my invention will appear from the description and drawings and will be particularly pointed out in the claims.

Figure 1:
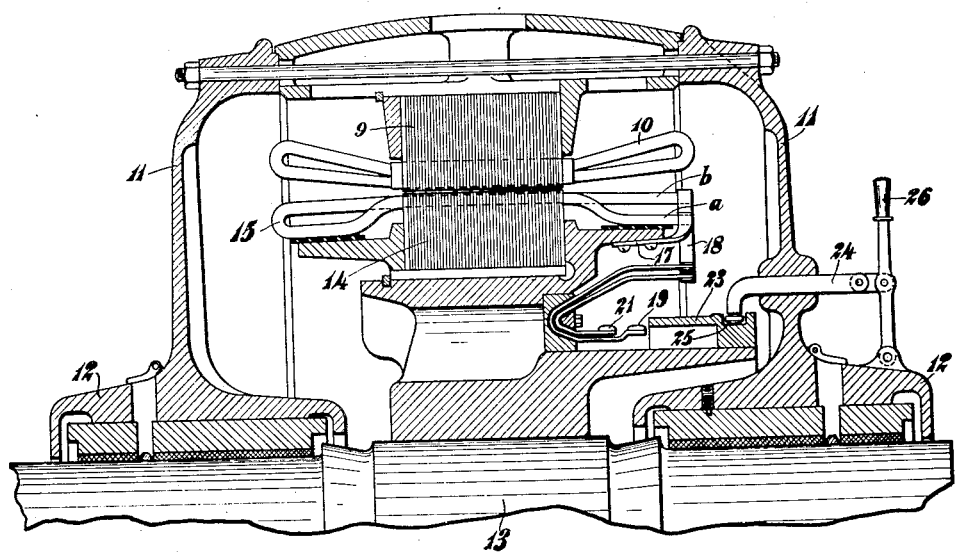
Figure 2:
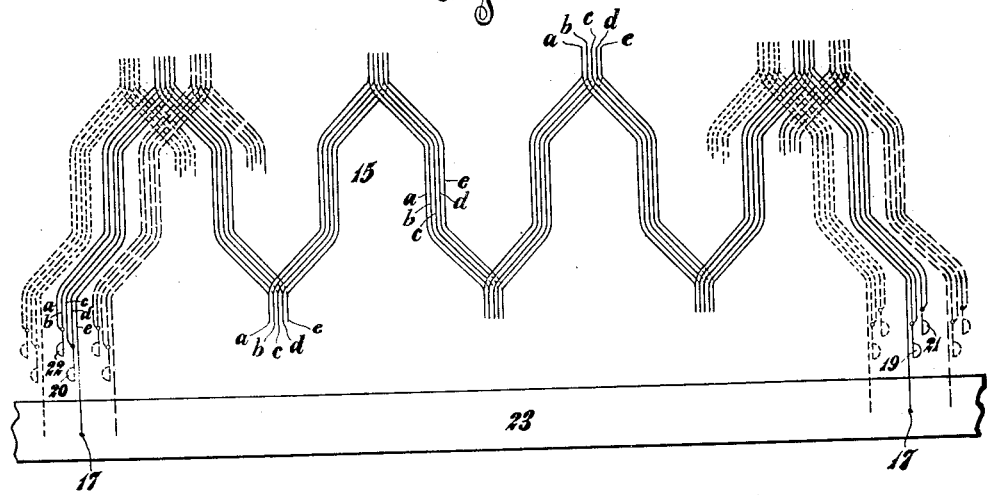

In the drawings, Figure 1 shows a partial section of an induction motor embodying my invention and Fig. 2 shows a partial development of the rotor windings.

The laminated field structure 9, containing in its slots the usual field windings 10 of an induction motor, is supported in any desired manner from a frame 11. In this frame are bearings 12 for a shaft 13 supporting a laminated magnetic structure 14 slotted to receive the rotor windings 15. The windings 10 may be arranged for single phase or polyphase, and the winding 15 may comprise any desired number of preferably similar sections.

In Fig. 2 I have shown a development of part of the rotor windings 15, one section being shown entire in full lines, while the ends only of the others are shown in short and long dashes respectively. Although for simplicity the rotor winding is shown with only three sections, generally it would have more than three. Each section consists of a number of similar parts $a$, $b$, $c$, $d$ and $e$. This number is preferably an uneven number and is here taken as five. Each of the parts $a$, $b$, $c$, $d$ and $e$ preferably goes successively through all of the slots for that one section, the angular distance between these successive slots being equal to the polar pitch of the field. These parts are permanently electrically connected end to end as shown, the electromotive forces of adjacent parts being in opposite directions. Thus the sum of the electromotive forces of the parts $a$, $c$ and $e$ is opposed by the sum of the electromotive forces of the parts $b$ and $d$, the total algebraic sum being the electromotive force of one part. The free ends of the windings $a$ and $e$ are connected to the frame of the machine at 17. Attached to the connectors 18 which join the ends of the parts $a$ and $b$, $b$ and $c$, $c$ and $d$, and $d$ and $e$ are contacts 19, 20, 21 and 22 respectively, these contacts being preferably flexibly mounted. A ring 23 is slidable longitudinally of the machine first to engage the contacts 19 and 20 simultaneously and then by further movement, the contacts 21 and 22. If preferred this ring may be made to engage the four contacts 19, 20, 21 and 22 successively. The ring 23 is movable in any desired manner as by means of a sliding rod 24 preferably provided with a roller or rollers which engage a groove 25 in said ring and operated by means of a handle 26. The stator circuit of the motor is closed when the handle 26 is in the position shown, with the ring 23 in engagement with none of the contacts 19 to 22 inclusive. The currents generated in each section of the rotor winding must now flow through all of the parts a, b, c, d and e in series, while because the electromotive forces of adjacent parts are opposing the total electromotive force of each section is equal to that of one of its parts. This is true for the windings of each phase. Thus the resistance of each section is the sum of its five parts, while the resistances of its five parts, while the electromotive force is that of but one of its parts. As the motor gains speed the ring 23 is pushed in to engage the contacts 19 and 20, thus connecting the parts a and b in series on a short-circuit through the frame and the parts d and e on a similar short-circuit. In each of these closed circuits, however, the sum of the electromotive forces is zero, for the electromotive forces of a and e are opposite and substantially equal to those of b and d respectively. The two ends of the parts c are connected together through the ring 23, thus making this part at this time the only working part. The electromotive force of this latter closed circuit is that of the one part c while the resistance is also that of one part. Although the electromotive force due to one part has decreased, because of the increase in the motor speed, the resistance of the circuit has decreased to maintain the current in the circuit nearly the same as at first. As the motor gains still further in speed and approaches synchronism, the ring 23 is moved in to engage the contacts 21 and 22, thus directly connecting the two ends of each of the parts a, b, c, d and e through the ring 23. This in effect connects these parts of the winding in parallel, so that while the electromotive force of each section is still that due to one part the resistance of each section is only one-fifth that of one part. Thus the current is again brought up approximately to the same value as at first, for while the increased speed of the motor has caused the electromotive force to decrease, the resistance has correspondingly decreased to maintain the current nearly constant.

In some instances the speed of the motor may be controlled by moving the ring 23 in and out to vary its slip.

Although I have here shown the rotor windings as wave windings, other forms of windings, such as lap windings, may be used.

With the arrangement here shown, no resistance other than that furnished by the rotor windings themselves is required, while the resistance of the rotor circuit is varied in the proportion of 25 to 1. By increasing the number of parts of the windings, this ratio of variation may be increased to any amount desired, the ratio of variation being equal to the square of the number of parts. By having the contacts 19 to 22 so arranged that they are engaged successively by the ring 23, the variation may be made more gradual.

Many modifications may be made in the precise arrangements herein shown and described, and all such which do not involve a departure from the spirit and scope of my invention I aim to cover in the following claims.

What I claim as new is:—

1. In a polyphase induction motor, the combination with a field magnet, of a rotor having a distributed polyphase winding, the winding for each phase comprising a plurality of substantially equal parts, and means whereby currents may be caused to flow in certain of said parts in series or in parallel.

2. In a dynamo-electric machine, a field magnet, an armature having a distributed winding comprising an uneven number of parts which generate substantially equal electromotive forces, and means for short-circuiting said parts in opposing pairs.

3. In a polyphase induction motor, the combination with a field magnet, of a wound rotor having a winding for each phase, each of said windings consisting of a number of substantially equal parts permanently connected end to end in a closed circuit, and means for short-circuiting said different parts individually.

4. In a polyphase induction motor, the combination with a field magnet, of a wound rotor having a winding for each phase, each of said windings consisting of a number of substantially equal parts permanently connected end to end, and means for short-circuiting said different parts in groups.

5. In a polyphase induction motor, the combination with a field magnet, of a rotor having a distributed winding for each phase, each of said distributed windings consisting of a number of parts permanently connected end to end, and means for short-circuiting said parts individually and in groups.

6. In an induction motor, a field magnet, a rotor having a distributed winding comprising an uneven number of parts permanently connected end to end, adjacent parts having opposing electromotive forces, and means for short-circuiting each opposing pair of said parts and the odd part and for short-circuiting the several parts individually.

7. In an induction motor, the combination of a field magnet, a wound rotor the winding of which has an odd number of equal parts of like phase, and means whereby current may be caused to flow in said several parts in series or in parallel.

8. In a dynamo-electric machine, a field magnet, an armature having a distributed winding comprising an uneven number of parts, and means for short-circuiting opposing pairs of said parts.

9. In an induction motor, the combination with a field magnet, of a rotor having a wave winding comprising an odd number of equal parts of like phase, and means whereby current may be caused to flow in said parts in series or in parallel.

10. In an induction motor, the combination of a field magnet, a rotor having a polyphase distributed winding, the winding for each phase comprising an uneven number of equal parts permanently connected end to end, and means for short-circuiting said parts in groups or individually in such a manner that the total electromotive force in any closed circuit is not greater than the electromotive force of one of said parts.

11. In an induction motor, a secondary member having a distributed winding which folds back on itself a number of times, the different folds being approximately similar, and means for successively connecting to a common junction various points at which the folds are made.

12. In an induction motor, a secondary member having a distributed winding which folds back on itself a number of times, the different folds being approximately similar, and means for simultaneously connecting to a common junction various points at which the folds are made.

13. In an induction motor, a secondary member comprising a slotted structure, a winding in said structure which extends through said slots successively, returns through the same slots in inverse order and again goes through the slots in the same order as at first, and means for connecting the points at which the winding turns back upon itself to a common junction.

14. In an induction motor, a secondary member having a distributed winding which folds back on itself a number of times, the different folds being substantially alike, and means for connecting the various points at which the folds are made.

15. In an induction motor, a secondary member having a distributed winding which folds back on itself a number of times, the ends of said windings being connected together and the different folds being substantially alike, and means for successively connecting to the ends of said windings various points at which the folds are made.

16. In an induction motor, a secondary member having a distributed winding which folds back on itself a number of times, the ends of said windings being connected together, and the different folds being substantially alike, and means for simultaneously connecting to the ends of said windings various points at which the folds are made.

17. In an induction motor, a secondary member comprising a slotted structure, a winding in said structure which extends through said slots successively, returns through the same slots in an inverse order and again goes through the slots in the same order as at first, and means for connecting the points at which the winding turns back upon itself to the ends of the winding.

18. In an induction motor, a secondary member comprising a slotted structure, a distributed winding in said structure which doubles through said slots a number of times, a connection between the ends of said windings, and means for connecting intermediate points on said winding to the ends thereof.

19. In an induction motor, a secondary member comprising a slotted structure, a distributed winding in said structure which doubles through a plurality of said slots a number of times, the ends of said winding being connected together, and a sildable ring for connecting the points at which the winding turns back upon itself to the ends of said winding.

20. In an induction motor, a secondary member mounted upon a shaft, said member comprising a slotted structure, a winding in said structure which extends through said slots successively in direct and inverse order a number of times, the ends of said winding being connected together, and a ring slidable longitudinally of the shaft for short-circuiting portions of said winding.

21. In an induction motor, a rotatable secondary member comprising a slotted structure, a support therefor, a distributed winding which folds back on itself through the slots in said structure a number of times, contacts connected to the points at which the folds are made, and a ring slidable longitudinally on said support and arranged to engage said contacts.

In testimony whereof I affix my signature, in the presence of two witnesses.

ROBERT B. WILLIAMSON.

Witnesses:
GEO. B. SCHLEY,
FRED. J. KINSEY.